Jan. 2, 1945.   I. I. SHULTZ   2,366,567
PROCESS FOR EXECUTING CATALYTIC CONVERSIONS
WITH REGENERATIVE CONTACT MASSES
Filed Jan. 29, 1940   3 Sheets-Sheet 1
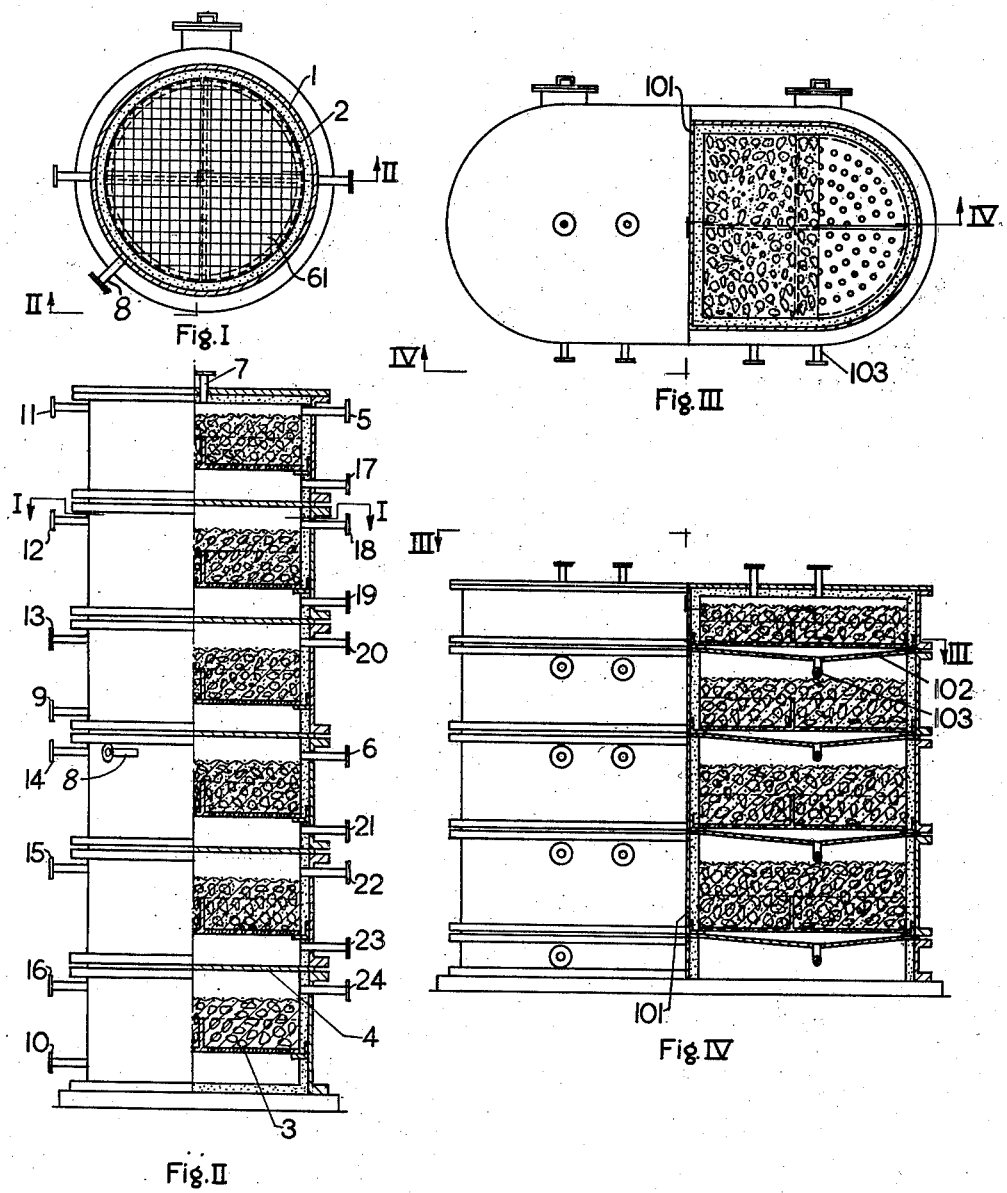

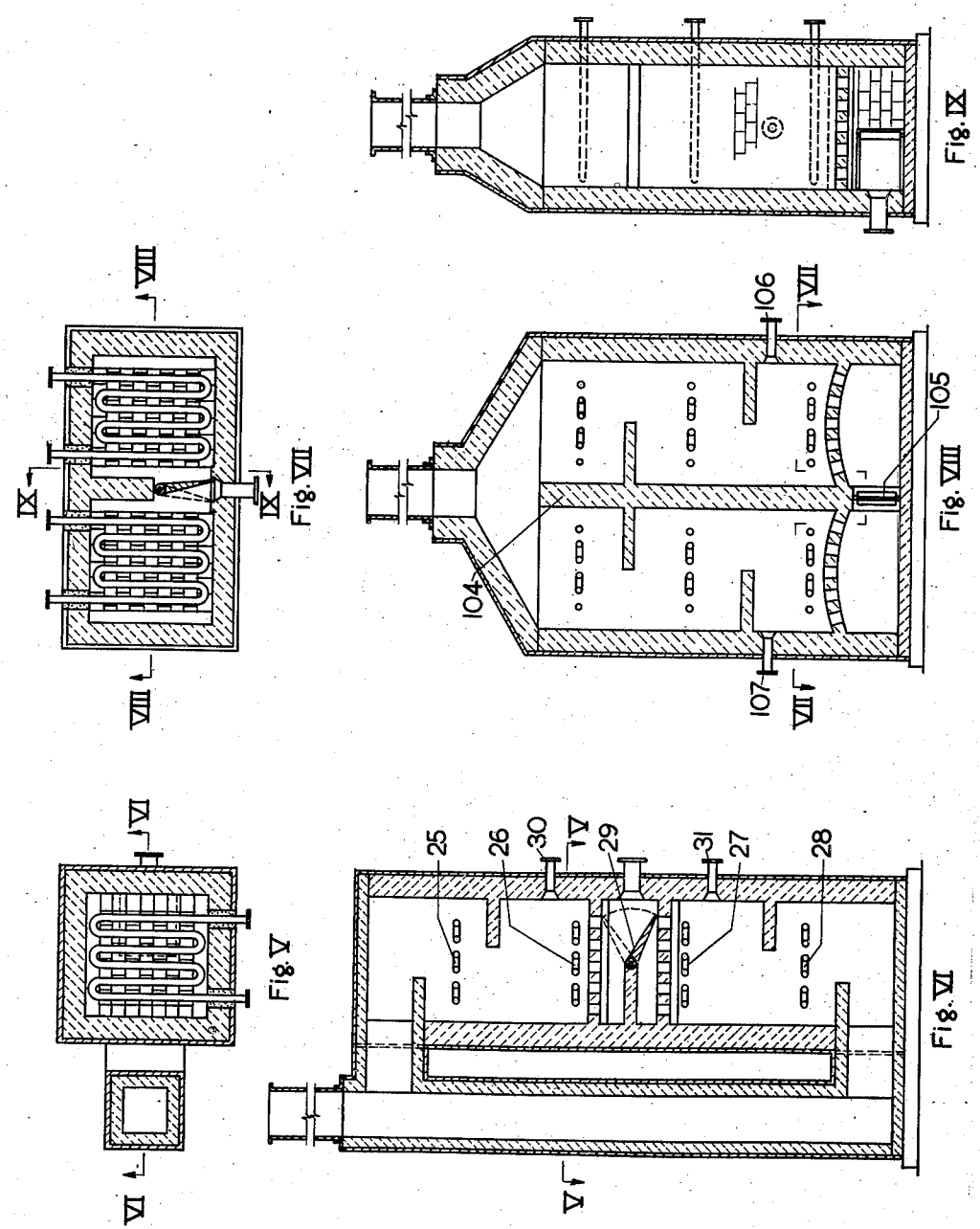

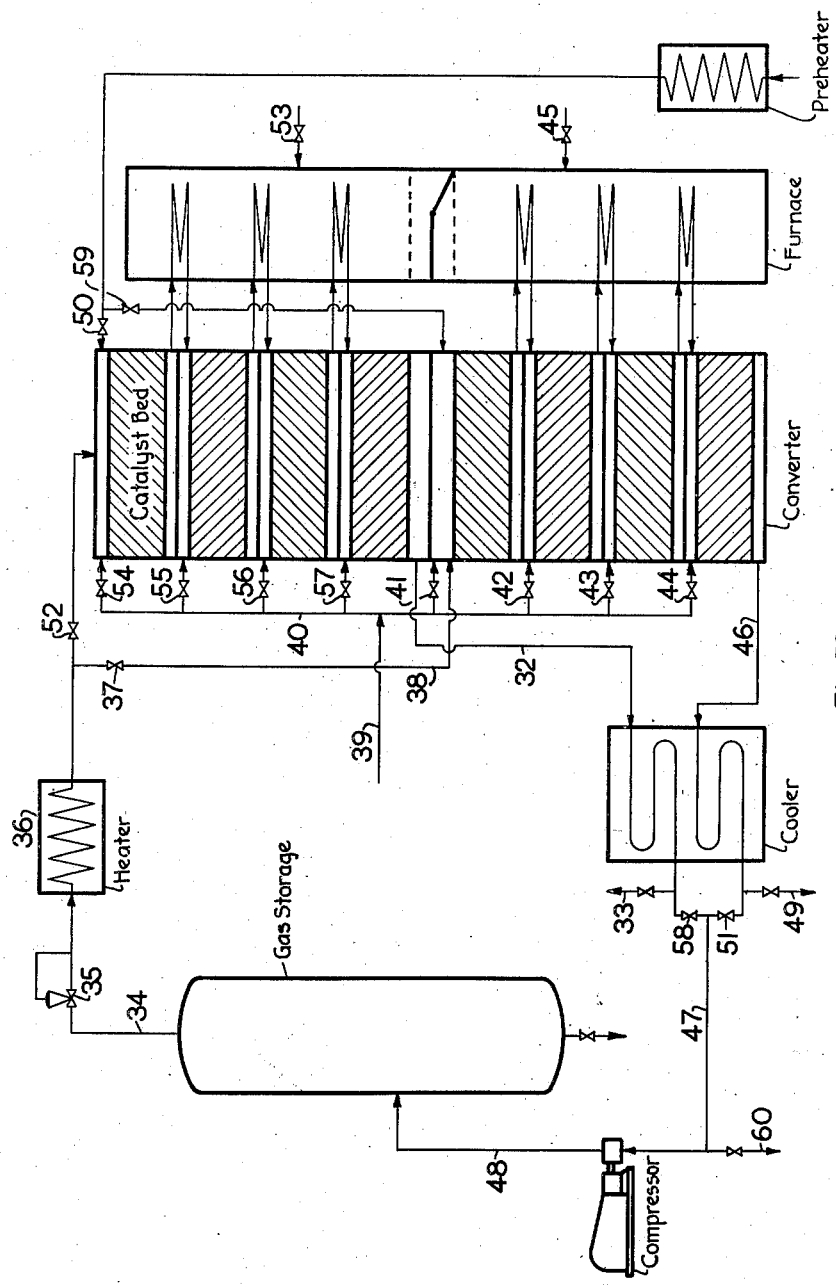

Patented Jan. 2, 1945

2,366,567

UNITED STATES PATENT OFFICE 2,366,567

PROCESS FOR EXECUTING CATALYTIC CONVERSIONS WITH REGENERATIVE CONTACT MASSES

Irving I. Shultz, Long Beach, Calif., assignor to Shell Development Company, San Francisco, Calif., a corporation of Delaware Application January 29, 1940, Serial No. 316,148

2 Claims. (Cl. 196—49)

The present invention relates to a process for executing catalytic conversions, particularly endothermic conversions, with the aid of regenerative contact masses and periodically restoring the efficiency of the contact mass in situ by passing a regenerating fluid therethrough. More particularly, the invention relates to the treatment of hydrocarbons with the aid of regenerative contact masses.

The methods employed in the production and treatment of petroleum products have undergone marked changes and are still being constantly improved. At one time the desired hydrocarbon products were simply separated from the petroleum by simple methods, refined, and sold as such. This practice was more recently superseded or augmented by thermal treatments. By suitable thermal treatments (particularly thermal cracking) much larger yields of more valuable hydrocarbon fractions can be obtained and, in some instances, products of superior properties produced.

At the present time the efforts of the industry are directed mainly towards the production of even better yields of further improved products by making use of various catalytic processes. These various catalytic processes fall under three main categories, namely synthesis, rearrangement and cracking. In the case of syntheses, the aim is to synthesize various desired hydrocarbons from low molecular weight materials, such as the lower olefins, the constituents of cracked and natural gas, etc. The various syntheses, such for instance as polymerization, alkylation, etc., nearly all involve exothermic reactions and can be conveniently carried out in many cases at low and moderate temperatures. Although much progress has been made with catalytic syntheses, and processes for the production of superior products from cracked gases, etc., are now used to a considerable extent, the catalytic treatment of hydrocarbon to produce various rearrangement and cracking reactions has not been so successful. The aim in these processes is to carry out certain useful individual rearrangement and/or cracking reactions, most of which occur to a certain extent in thermal treatments, under closely controlled conditions. These reactions, since they are generally endothermic and usually require relatively high temperatures, are made much more difficult to carry out on a commercial scale.

There are, at the present time, two main methods for carrying out these various endothermic processes. Although a certain measure of success has been achieved by both methods in isolated cases, both methods possess certain inherent disadvantages which make their application very costly.

According to the first of these methods the hydrocarbon or other combustible fluid to be treated is passed, usually in the vapor phase, through a suitable contact mass packed in heated tubular reactors. Since, in this method, the heat required must be introduced into the reaction zone through the reactor walls, metallic tubes of small diameter (usually less than 3½ in.) and considerable length must be employed. This requires the use of a great number of tubes, for instance, a plant capable of handling 1000 bbls. of feed per day would require over 250 tubes each 14 feet long. Furthermore, the tubes are quite expensive and must be frequently replaced since the only commercial materials so far found which possess the necessary mechanical strength and heat conductivity and which are capable of withstanding the repeated changes in temperature and change from reducing conditions (conversion period) to oxidizing conditions (regeneration period) are a few expensive alloy steels, and even these have only a very short life. The use of such tubes also carries other very important disadvantages. The time required for the periodic reactivation or regeneration of the contact mass is approximately proportional to the length of the contact bed and is quite long when using such tubes; also many of the most desirable contact masses are quickly poisoned when employed in contact with the heated metal tubes.

The other alternative method for executing such reactions is to pass the material to be treated, usually in the vapor phase, in contact with a contact mass contained in a converter of relatively large dimensions. In this method the necessary heat is either supplied by heating tubes embedded in the catalyst mass or by periodically heating the contact mass. This method, while it has certain advantages over the above-described method using tubes packed with contact material, has inherent disadvantages which militate against its use. If the necessary heat is to be applied all or in part by suitable heating tubes embedded in the contact mass, it is necessary to circulate molten eutectic salt mixtures. This is very expensive and troublesome and presents very great engineering difficulties. Furthermore, this method of heating can be applied only when employing certain particular contact materials which are not poisoned by contact with the metal heating tubes. If the heat is to be supplied by periodically heating the contact mass, the process cannot be executed under closely controlled conditions at the most desirable temperature but is executed at a varying temperature as the contact mass cools. This method also necessitates the use of very short conversion periods; it also entails considerable loss of time and the converter must be subjected to high vacuum after each conversion period in order to avoid excessive loss of material. Also, the regeneration takes place over a temperature range and consumes more time when this method is applied.

I have invented and developed a new and improved method and apparatus for executing catalytic conversions of the type in question. When executing such conversion processes according to the present method most of the disadvantages inherent in the hitherto proposed methods are substantially avoided.

According to the present method, the contact mass is divided into a plurality of separate beds in a suitable reaction converter. The material to be treated is preheated outside of the converter and led, preferably in the vapor phase, consecutively through the various beds of contact material. After contacting the first portion of contact mass in the first bed, and before contacting each succeeding bed of contact mass, the partially converted material is withdrawn from the reactor and passed through suitable coils in a closely associated furnace wherein a desired quantity of heat is added. In the regeneration or reactivation step a conventional regenerating fluid is passed through the converter, an oxidizing fluid, such as air, is introduced into the converter near the head of each individual bed of contact material to be regenerated, and heat is withdrawn from the regenerating fluid before passing through each successive bed of contact mass by means of these same exterior coils.

The process and apparatus of my invention, as well as certain modifications and embodiments thereof, are described in more detail with reference to the attached drawings. Referring to the drawings, Figs. I and II are horizontal and vertical sections respectively of one type of suitable converter. Figs. V and VI are horizontal and vertical sections of a variable temperature furnace adapted for use with a converter of the type illustrated in Figs. I and II. Fig. X is a flow diagram of a suitable arrangement of apparatus employing a converter of the type illustrated in Figs. I and II in combination with a furnace of the type illustrated in Figs. V and VI. Figs. III and IV illustrate, partly in sections, a plan and elevation of a converter of somewhat different construction. Figs. VII, VIII and IX are plan, elevation and profile sections illustrating a furnace adapted to be employed with a converter of the type illustrated in Figs. III and IV.

Referring to Figs. I and II, the converter comprises a shell 1, which is preferably lined in the interior by a suitable material 2 such as ceramic lining, "gunnite" or the like. The converter is provided with a plurality of separate beds of contact mass, each supported on ribbed perforated plates 3. In order to avoid motion and uneven distribution of the catalyst, the respective catalyst layers may be covered by suitable screens 61. Between the various beds of contact mass, the converter is separated by partitions 4. The converter, as shown in Figs. I and II, is designed to be operated continuously with either the upper or lower three beds of contact mass on conversion while the other three beds are being reactivated. The converter is provided with a feed inlet 5 for the upper three beds, a feed inlet 6 for the lower three beds, a regenerating fluid inlet 7 for the upper three beds, a regenerating fluid inlet 8 for the lower three beds, an outlet 9 for the upper three beds, an outlet 10 for the lower three beds, inlets 11 to 16 for oxidizing fluid situated near the head of each bed of contact mass, and connections 17—24 for exterior coils by-passing the upper two and lower two partitions.

The connections 17 and 18, 19 and 20, 21 and 22, and 23 and 24, are connected to coils 25, 26, 27 and 28, respectively, in a suitable variable temperature furnace such as illustrated in Figs. V and VI. The furnace illustrated in Figs. V and VI is fired near the center and is provided with means 29 for deflecting the hot gases either up past coils 25 and 26 or down past coils 27 and 28. The furnace is furthermore provided with steam inlets 30 and 31. These steam inlets are for the purpose of slightly cooling either section of the furnace when the corresponding section of the converter is on regeneration and the hot gases are being deflected through the opposite section.

The application of apparatus of the general type illustrated in Figs. I, II, V and VI is illustrated by the flow diagram shown in Fig. X. For the purpose of illustration it is assumed that the upper four beds of catalyst mass in the converter are on conversion and that the lower four beds of contact mass are being regenerated. The material to be treated is brought to approximately the desired reaction temperature and enters the converter through valve 50 above the uppermost bed of contact mass. In passing down through the upper bed of contact mass partial conversion is effected and the temperature of the material drops. After contacting the upper layer of contact mass, the partially converted and cooled material passes through the uppermost coil in the furnace wherein it is reheated to the desired temperature and returned to the converter to a point just below the uppermost partition. When the material has passed through all of the four layers of contact material in the upper section in this manner, it leaves the converter via a pipe 32, is cooled in the cooler, and is finally withdrawn via a valved connection 33.

At the same time the four lower layers of contact mass are being regenerated. A regenerating fluid (for instance any inert gas such as combustion or flue gas) from the gas storage vessel is led via pipe 34 in which there is an automatic pressure regulating valve 35 controlled by the low pressure side, heater 36, valve 37, and pipe 38 into the upper section above the four lower beds of contact material. A controlled amount of oxidizing gas (usually air, steam, or steam and air) is fed by means of pipe 39, manifold 40 and valved inlets 41—44 into the converter just above each bed of contact mass to be regenerated. The regenerating gas, after passing through the upper of the four lower layers of contact mass, passes through the upper of the lower three coils in the lower section of the furnace wherein heat is withdrawn, and is then mixed with a second portion of oxidant entering via 42 and passes through the next lower layer of contact mass, etc. In order to withdraw heat from the regenerating gas in the coils in the lower section of the furnace, the hot gases are deflected upward and a small amount of steam may, if desired, be introduced into the lower section of the furnace via a valved inlet 45. The spent regenerating fluid is withdrawn from the bottom of the converter via outlet 46 and the cooler, and is recirculated via pipe 47, the compressor and pipe 48 back to the storage tank. Excess spent regenerating medium beyond that required for recirculation, etc., is allowed to escape via a valved outlet, 60.

When it is desired to regenerate or reactivate the upper four catalyst layers, valves 37, 41—45, 50 and 51 are closed; valves 52—59 are opened, and the hot gases in the furnace are deflected downward. The feed then enters the converter above the upper of the four lower layers of contact mass, passes through the various layers of contact mass and the three lower coils in the described manner, and finally leaves the system via pipes 46, the cooler, and valved outlet 49. The regenerating medium meanwhile enters the converter via valve 52 at the top, passes in the described manner through the upper layers of contact mass, and leaves the converter via outlet 32. During the reactivation of the upper section of the converter, an oxidant is introduced via valved inlets 54—57, and steam may be injected into the furnace via valved inlet 53.

In many cases, especially when the conversion periods are relatively short and/or when the contact mass is particularly sensible to water vapors, it is desirable to flush the reactants from the system just prior to beginning the reactivation. When employing apparatus arranged as indicated in Fig. X, this may be done by passing a quantity of the inert gas from the gas storage through the system with the compressor stopped before opening the air inlets 54—57 (or 41—44). The inert gas, after flushing the system of reactants, leaves via valved outlet 60.

Figs. III and IV illustrate a converter embodying the same principles but of somewhat different construction. In this converter the catalyst beds are divided into two sections by a vertical partition 101 such that the beds of contact mass on one side may be employed on conversion while the beds of contact mass on the other side are being regenerated. The details of the converter are otherwise much the same as described with regards to Figs. I and II except that the horizontal partitions 4 of Fig. II are shown somewhat conical at 102 and are connected at their apices with the outlet pipes 103 which outlet pipes leave the converter from points below the partition rather than above the partition as in the converter shown in Figs. I and II.

Converters of the type illustrated in Figs. III and IV may be conveniently employed in conjunction with a furnace such as illustrated in Figs. VII, VIII and IX. Referring to Figs. VII, VIII and IX, it is seen that the furnace, like the converter, is divided into two sections by a vertical partition 104. At the lower part of the partition there is provided a device 105 for deflecting the hot gases to either side. Inlets 106 and 107 are also provided for introducing steam into the cooling side of the furnace.

The advantages which may be realized through the use of the apparatus and method of my invention are several and important. According to the present method of operation, beds of contact mass of relatively large cross-section allowing large throughput capacities may be easily employed. Thus, for example, whereas a plant capable of treating 1000 bbls. of feed per day requires, in general, about 270 three-inch tubes, each 14 feet long, this same throughput may be treated more efficiently according to the invention in one small two-section converter, such as illustrated in Figs. I and II, having a total on-stream depth of catalyst of only 4½ feet and occupying only about 21 square feet of floor space. Since the heat is applied to the reactants outside of the reaction chamber, and not through the converter walls, the converter may be lined with a ceramic or other material which does not deteriorate readily, catalyze the formation of carbon, and poison the contact mass. Due to the fact that the heat is supplied and withdrawn from the reactants in a plurality of stages, only relatively mild heating and cooling need be applied, and difficulties due to severe temperature changes in the reactor are avoided. This not only reduces the cost and upkeep of the converters but also minimizes other secondary difficulties which are commonly encountered, such, for example, as the deposition of carbon and tars, the degradation of the catalyst particles, etc.

Another advantage afforded by the present process is the economy with which the regeneration may be effected. Since the catalyst is employed in a plurality of layers, the time required for reactivation may be maintained much shorter than that possible when employing the conventional tubular type reactors; in fact, the reactivation, under optimum conditions, is reduced by a factor which is approximately the reciprocal of the number of layers of catalyst reactivated. Furthermore, the cost of pumping the regenerating gas through the catalyst requires considerable energy and always represents a substantial proportion of the reactivation costs; according to the present process the cost of pumping the regenerating gas through the catalyst during reactivation is less than that when employing tubular type reactors by approximately this same factor. These various advantages are of the utmost importance in the large-scale execution of endothermic hydrocarbon reactions.

The method and apparatus of my invention are also advantageous over the conventional methods in that they allow the materials to be treated under more favorable conditions. The adjustment and control of the reaction conditions to meet the demands of the material treated has heretofore been given insufficient consideration. One reason for this is that the conventional methods of operation do not allow sufficient control of these conditions. If it is desired to treat a certain material with a certain catalyst, the usual practice is to pass the material through the reactor at different conditions of space velocities and temperature and then choose those conditions which give the best results. This does not establish the optimum conditions for the reaction but only an average condition which is most practical for the particular apparatus in question. When employing the present method, however, it is possible to go further than this and establish and maintain conditions which are more nearly the optimum for the particular reaction in question. Thus, when treating a hydrocarbon in the presence of a regenerative contact mass, the composition and character of the material undergoes considerable change during its passage through the reactor. In some cases, for instance in certain catalytic cracking processes, the reaction products are much less stable than the reactant while in others, for instance in certain catalytic dehydrogenation processes, the reactants are much less stable than the reaction products. It is found that as a general rule, in executing reactions of the former type by conventional methods, the deposition of tars, etc., on the contact mass and the loss in activity incident thereto are predominantly in the first contacted portions of the contact mass, whereas in the processes of the latter type such deposition and deactivation are largely confined to the last contacted portion of the contact mass. This is due to the fact that the conditions prevailing in the reaction zone are not adjusted according to the changing nature of the reactants, but are average over-all conditions.

According to the process of the present invention the conditions more nearly optimum for the particular reactants in question may be established and maintained by adjusting the thickness of catalyst beds and/or the amount of heat supplied to the reactants in the various coils. Thus the present process, may be applied in any of three ways, according to the nature of the reactants, the catalyst, and the reaction. In one embodiment of the invention the various catalyst beds are employed in substantially equal thickness and the coils are adjusted to give substantially equivalent heat transfer. By operating in this manner the reaction is carried out with an increasing temperature gradient. This method of operation is usually most advantageous when executing conversions in which products of increased stability are produced.

According to a second embodiment of the invention the various catalyst beds are employed in substantially equal thickness and the coils are adjusted, for instance by their length or position, to supply an amount of heat approximately proportional to the temperature drop in the respective beds. When operating in this manner the reaction is carried out at a constant temperature, or, if desired, a somewhat decreasing temperature gradient. This method is usually most advantageous when executing conversions in which products of lesser stability are produced, although it may also be advantageous in certain cases for reactions of the former type.

When executing a process according to one of these embodiments, the conversions and temperature drops in each succeeding layer of catalyst become smaller. This is illustrated in the following table showing data relating to the dehydrogenation of butane. The pertinent data are:

Feed: 14% iso-butane and 86% n-butane
Catalyst: 8–14 mesh alumina impregnated with 13–15% chromium as oxide
Space velocity: 35 volumes of butane gas measured at standard conditions per volume of catalyst per minute
Average conversion to butene: 30%
Total depth of catalyst bed: 4.5 feet

Table I

| Number of layers of catalyst on conversion | Catalyst layer, in order of contact | Depth of catalyst per layer, inches | Butene conversion per layer, per cent | Temp. drop per layer, °F. |
|---|---|---|---|---|
| 3 | 1st | 18 | 14.7 | 162 |
|   | 2nd | 18 | 8.9 | 98 |
|   | 3rd | 18 | 6.4 | 71 |
| 4 | 1st | 13.5 | 11.5 | 127 |
|   | 2nd | 13.5 | 7.4 | 82 |
|   | 3rd | 13.5 | 5.9 | 65 |
|   | 4th | 13.5 | 5.2 | 57 |
| 6 | 1st | 9 | 8.4 | 92 |
|   | 2nd | 9 | 6.3 | 69 |
|   | 3rd | 9 | 4.6 | 51 |
|   | 4th | 9 | 4.4 | 48 |
|   | 5th | 9 | 3.7 | 41 |
|   | 6th | 9 | 2.6 | 29 |

According to a third embodiment of the invention, coils adjusted to give substantially equivalent heat transfer are employed and the thickness of the various beds of contact mass are adjusted to provide a substantially equal temperature drop. By operating according to this method, the reaction may be executed at a constant or substantially constant temperature to effect high conversions. It is most advantageous for conversions in which products of increased stability are produced.

When operating according to this embodiment, the conversions and temperature drops in the various layers of catalyst are approximately equal. This is illustrated in the following table which also relates to the dehydrogenation of butane. The pertinent data are the same as given above.

Table II

| Number of layers of catalyst on conversion | Catalyst layer, in order of contact | Depth of catalyst per layer, inches | Butene Conversion per layer, percent | Temp. drop per layer, °F. |
|---|---|---|---|---|
| 3 | 1st | 11 | 10.0 | 110 |
|   | 2nd | 18 | 10.0 | 110 |
|   | 3rd | 25 | 10.0 | 110 |
| 5 | 1st | 6 | 6.0 | 66 |
|   | 2nd | 8 | 6.0 | 66 |
|   | 3rd | 11 | 6.0 | 66 |
|   | 4th | 12 | 6.0 | 66 |
|   | 5th | 17 | 6.0 | 66 |

By adapting the apparatus to operate according to one of the three above specific modes, it is not only possible to adjust and maintain the conditions to suit the changing nature of the reaction mixture, but it is also possible to provide a uniform rate of decline of the various catalyst beds. This is of considerable importance since it allows the reactivation to be effected in the most efficient and economical manner. Thus, when executing a reaction wherein the deposition of carbonaceous matter normally occurs predominantly in that portion of the contact mass that is first-contacted, it is preferable either to employ contact beds of equal thickness and to maintain an increasing temperature gradient, or to employ contact beds of progressively increasing thickness. Beds of contact mass of progressively increasing thickness suitable for this latter mode of operation are shown in the converter illustrated in Figs. III and IV. By adjusting the conditions for the particular circumstances as above described, the periodic reactivation of the contact mass may be carried out most efficiently and in the shortest possible time.

While the present process and apparatus may be advantageously employed in the execution of any endothermic conversion with the aid of any of the conventional regenerative contact masses commonly used therefor, they are, in view of their several inherent advantages, particularly advantageous for the execution of endothermic hydrocarbon conversions, such for example as dehydrogenation, reforming and cracking. In these various processes any of the conventional regenerative contact masses may be employed. For example in hydrocarbon dehydrogenation and reforming processes a conventional dehydrogenation or reforming catalyst such as active alumina, certain treated bauxites, certain zeolithic masses, or supported catalytic metal oxides or sulfides such as those of Cr, Mo, W, etc., may be used. In catalytic cracking, on the other hand, any of the conventional partially hydrated silica-alumina and silica-zirconia catalysts may, for example, be employed. Numerous other suitable regenerative catalysts which may be applied in the apparatus and method of the present invention are disclosed in detail in the scientific and patent literature relating to the various respective processes.

I have, in the foregoing, described my invention in its preferred embodiments and shown by illustration various apparatus suitable for the execution thereof. I am aware, however, that the described process and apparatus are capable of numerous variations and modifications which will be apparent to those skilled in the art. I do not, therefore, desire my invention to be limited by the specific embodiments illustrated. On the other hand, it is my intention that all such variations and modifications as fall within the spirit of the invention be comprehended in the scope of the claims.

I claim as my invention:

1. In a hydrocarbon treatment, wherein a hydrocarbon to be treated is contacted with a regenerative contact mass and the contact mass is periodically regenerated by passing a regenerating fluid therethrough, the combination of steps comprising passing a hydrocarbon to be treated through a bed of regenerative contact mass under reaction conditions whereby a partial conversion accompanied by a temperature drop is effected, withdrawing the partially-converted hydrocarbon and adding heat thereto, contacting the heated partially-converted hydrocarbon with a second and larger portion of contact mass whereby further conversion accompanied with a second drop in temperature approximately equal to the first is effected, withdrawing reacted hydrocarbon, and periodically restoring the efficiency of the contact mass by passing a fluid regenerating medium through said first bed of contact mass, withdrawing said fluid regenerating medium and withdrawing heat therefrom, passing said cooled regenerating medium through said second portion of contact mass, withdrawing spent regenerating medium and introducing an oxidizing fluid into said regenerating medium just prior to its contact with each successive bed of contact mass.

2. In an endothermic treatment or conversion of a combustible fluid material wherein the material to be treated is contacted with a regenerative contact mass at an elevated temperature and the contact mass is periodically regenerated by oxidizing combustible deposits therefrom, the combination of steps comprising passing the fluid material to be treated through a bed of regenerative contact mass under treating conditions whereby a partial conversion accompanied by a temperature drop is effected, withdrawing the partially converted material and adding heat thereto, passing the heated partially-converted material through a separate and larger portion of contact mass whereby further conversion accompanied by a temperature drop approximately equal to the first is effected, withdrawing treated material, and periodically restoring the efficiency of the contact mass by passing a fluid regenerating medium through a bed of said contact mass, withdrawing said fluid regenerating medium and withdrawing heat therefrom, passing said cooled regenerating medium through a second portion of said contact mass, withdrawing spent regenerating medium, and introducing an oxidizing fluid capable of oxidizing combustible matter into said regenerating medium just prior to its contact with each successive bed of contact mass.

IRVING I. SHULTZ.